(12) United States Patent
Suzuki et al.

(10) Patent No.: US 7,387,257 B2
(45) Date of Patent: Jun. 17, 2008

(54) CARD RECORDING APPARATUS AND A CARD STORAGE CASSETTE

(75) Inventors: Yoshitaka Suzuki, Saitama-ken (JP); Shigeru Kato, Yokohama (JP); Keiji Ihara, Sagamihara (JP)

(73) Assignee: Victor Company of Japan, Limited, Yokohama, Kanagawa-ken (JP)

( * ) Notice: Subject to any disclaimer, the term of this patent is extended or adjusted under 35 U.S.C. 154(b) by 329 days.

(21) Appl. No.: 11/192,185

(22) Filed: Jul. 29, 2005

(65) Prior Publication Data

US 2006/0102720 A1 May 18, 2006

(30) Foreign Application Priority Data

Oct. 29, 2004 (JP) .......................... P2004-315879

(51) Int. Cl.
*G06K 7/00* (2006.01)
(52) U.S. Cl. ...................... 235/486; 435/492; 435/475
(58) Field of Classification Search ................ 235/486, 235/380, 475, 492; 221/177–179
See application file for complete search history.

(56) References Cited

U.S. PATENT DOCUMENTS

| | | | | |
|---|---|---|---|---|
| 4,993,587 A | * | 2/1991 | Abe | 221/21 |
| 5,753,897 A | * | 5/1998 | Kasper | 235/380 |
| 5,773,805 A | * | 6/1998 | Nakamura et al. | 235/441 |
| 5,959,278 A | * | 9/1999 | Kobayashi et al. | 235/449 |
| 6,249,303 B1 | * | 6/2001 | Mochizuki et al. | 347/222 |
| 6,598,794 B1 | * | 7/2003 | Ishii | 235/449 |
| 6,659,357 B1 | * | 12/2003 | Tewes | 235/492 |
| 6,722,649 B2 | * | 4/2004 | Yui | 271/184 |
| 6,957,746 B2 | * | 10/2005 | Martin et al. | 221/131 |
| 7,111,790 B2 | * | 9/2006 | Arseneau et al. | 235/475 |

FOREIGN PATENT DOCUMENTS

JP          11-227953          8/1999

* cited by examiner

Primary Examiner—Ahshik Kim
(74) Attorney, Agent, or Firm—The Nath Law Group; Jerald L. Meyer; Stanley N. Protigal

(57) ABSTRACT

Regarding a card storage cassette for use in a card recording apparatus in which a plurality of cards are stacked vertically with their face maintained substantially horizontal, the present invention provides in one embodiment a card recording apparatus and its card storage cassette in which cards can be replenished even when the undermost card is being ejected from the card storage cassette. While the card storage cassette (30) to be detachably mounted on the cassette mount platform formed on the right side plate of the outer chassis of the card recording apparatus is framed by joining a cassette body and a cassette cover, the cassette cover can be removed from the cassette body along a vertical guide member.

3 Claims, 11 Drawing Sheets

PULL-OUT DIRECTION OF IMAGE RECEIVING TAPE

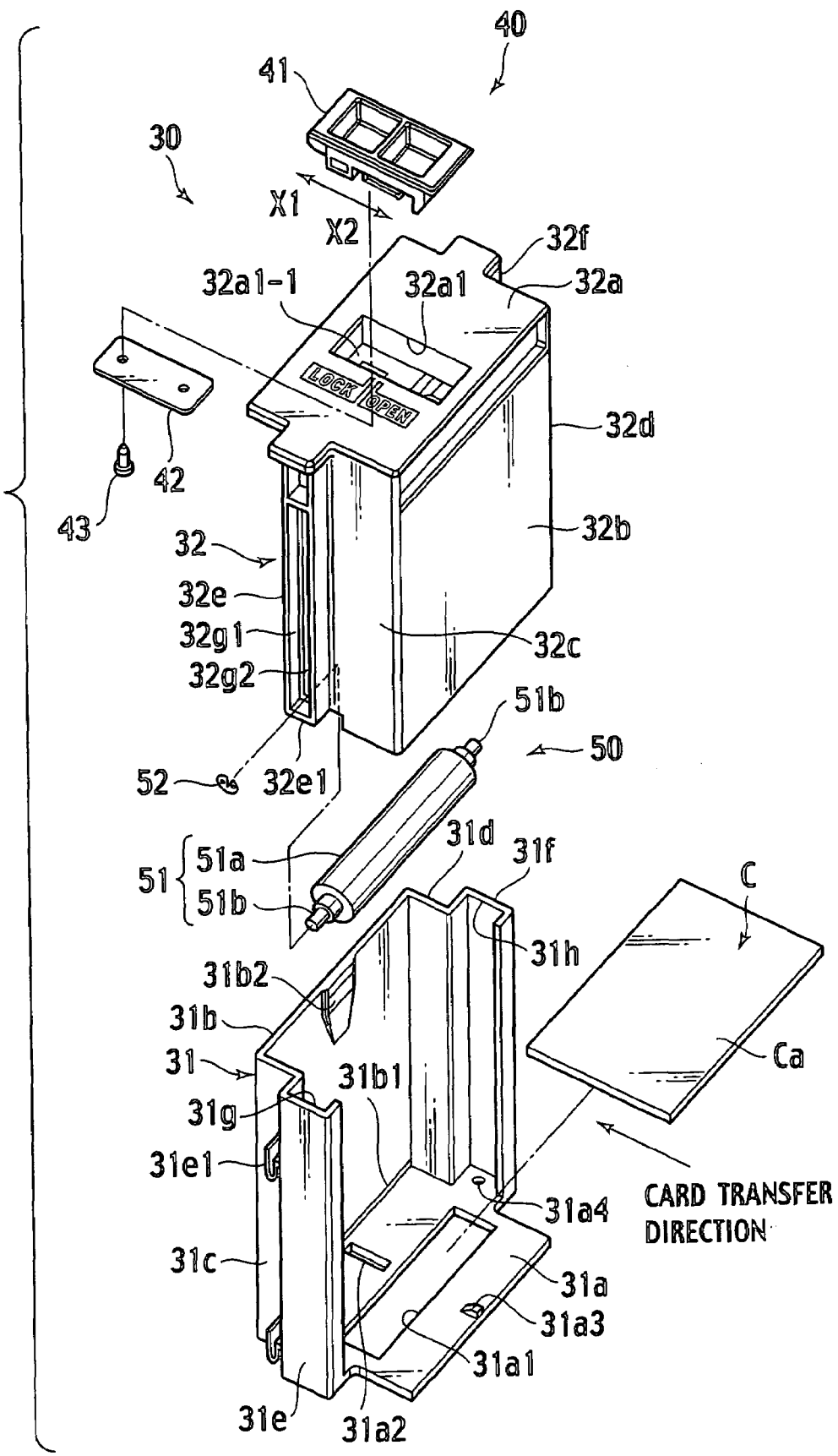

CARD TRANSFER DIRECTION

CARD RECORDING APPARATUS AND A CARD STORAGE CASSETTE

BACKGROUND OF THE INVENTION

1. Field of the Invention

This invention relates to a card recording apparatus for recording characters, pictures, magnetic information or the like onto a card. In addition, this invention relates to a card storage cassette that stores a plurality of cards in piles so as to maintain their faces substantially horizontally and pulls out the undermost card by the aid of a pick-up roller provided outside.

2. Description of the Related Art

At the advent of a card era, various cards have already come into a practical use. As an example are cited an ID card (or a card type ID) having a facial portrait thereon, a credit card having an IC memory, a bank card, a various kind of pre-paid cards.

By the way, there has been known a card printing apparatus, for example, that records various information on various cards to provide them successively and automatically with a user, the apparatus being configured to have a card storage cassette that stores a plurality of cards in piles so as to maintain their faces substantially horizontally and pulls out the undermost card by rotation of a pick-up roller provided outside. There has been disclosed a sheet storage magazine configured with two box-shaped vertically separable casings as an example of such a card storage cassette and a card printing apparatus using the same (Refer to Japanese Patent Application Laid-open Publication No. H11-227953, page 5, FIGS. 1 and 2).

FIG. 1 is a schematic view of the related-art card printing apparatus and sheet storage magazine. FIG. 2 is a perspective view of the sheet storage magazine illustrated in FIG. 1.

The card printing apparatus 100 and the sheet storage magazine 200 illustrated in FIG. 1 are disclosed in Japanese Patent Application Laid-open Publication No. H11-227953 and described hereinafter with reference with the publication.

In the card printing apparatus 100 illustrated in FIG. 1, the sheet storage magazine 200 is demountably disposed at the uppermost stream side along a transfer direction of the sheet in an outer chassis 101 that serves as an exterior of the card printing apparatus 100.

The sheet storage magazine 200 stated above is configured into a box shape by integrally joining a body 201 and a lid 202, which are horizontally separable with each other, by the aid of an appropriate attaching member (not shown). Inside the sheet storage magazine 200, a plurality of card-shaped image receiving sheets S are stacked vertically one on another on a bottom 201a of the body 201. When storing the sheets S therein, the sheets S are loaded into the body 201 after the lid 202 has been opened and then the lid 202 is closed. Then, the sheet storage magazine 200 is mounted in the card printing apparatus 100 so that the lid 202 is located facing a sheet transfer path 102.

In addition, in the sheet storage magazine 200, a weight member 210 is placed on the uppermost one of the plurality of the image receiving sheets S so as to be movable in a direction of the gravitational force. With this weight member 210, the undermost one of the image receiving sheets S is pressed down on a pick-up roller 103 described hereinafter. Specifically, the weight member 210 is composed of a weight 211 and a weight supporting plate 212, the weight 211 being secured on the supporting plate 211. In addition, both side portions of the weight supporting plate 212 are attached so that the supporting plate 212 is slidably guided along the body 201 and the lid 202 in a direction of the gravitational force.

In addition, in the card printing apparatus 100, there is rotatably provided a pick-up roller 103 beneath the sheet storage magazine 200. The pick-up roller 103 abuts the undermost one of the plurality of the image receiving sheets S stacked in the sheet storage magazine 200. The undermost image receiving sheet S is pulled out from the sheet outlet 202a provided in the lower portion of the lid 202 by the pick-up roller 103 and then sent to a printing portion 105 by a pair of resist rollers 104A, 104B.

The aforementioned printing portion 105 is composed of a thermal head 106, an ink ribbon 107 on which dye sublimation ink is coated, a supply reel 108 that supplies the ink ribbon 107, a winding reel 109 that winds the ink ribbon 107, a platen roller 110 that presses the image receiving sheet S onto the thermal head 106, and the like. In accordance with a signal inputted, the thermal head 106 thermally transcribes the dye sublimation ink on the ink ribbon 107 so as to print a facial portrait or the like on the image receiving sheet S.

Then, after printing is completed, the image receiving sheet S is subject to a fixing treatment by a pair of fixing rollers 111A, 111B and then ejected from the outer chassis 101 by a pair of dispensing rollers 112A, 112B.

By the way, in the related-art card printing apparatus 100 described above, the sheet storage magazine 200 is demountably disposed at the uppermost stream side along a sheet transfer path 102 in the outer chassis 101. When the image receiving sheets S are ejected one by one and the remaining number of the sheets S comes close to zero, the image receiving sheets S have to be replenished into the sheet storage magazine 200. When replenishing the image receiving sheets S, since the sheet storage magazine 200 has to be removed from the card printing apparatus 100 to open the lid 202, the sheets S cannot be replenished when printing continues. In other words, since the sheet outlet 202a for ejecting the image receiving sheet S is provided at the undermost portion of the lid 202 although the image receiving sheets S are stacked in the body 201, the lid 202 cannot be separated when the sheets are being ejected. Because of this, the related-art card printing apparatus 100 and sheet storage magazine 200 are disadvantageous in terms of usability.

Under these circumstances, regarding a card recording apparatus that is used to record characters, pictures, magnetic information, or the like on a card and is demountably equipped with a card storage cassette in which a plurality of cards are stacked vertically with their face maintained substantially horizontal, there has been desired a card recording apparatus and its card storage cassette in which card replenishment can be performed even when the undermost card is being ejected from the card storage cassette.

SUMMARY OF THE INVENTION

The present invention has been made under the aforementioned disadvantages. A first aspect of the present invention provides a card recording apparatus comprising a card storage cassette that stores a plurality of cards so that the cards are vertically stacked while maintaining a card face of the cards substantially horizontal, a pick-up roller that ejects the undermost one of the plurality of cards stored in the card storage cassette from the storage cassette, and a recording means that records predetermined information on the card ejected from the card storage cassette. The card storage cassette includes a cassette body having a bottom plate on which the plurality of cards are vertically stacked while maintaining a card face of the cards substantially horizontal, the bottom plate allowing the pick-up roller to enter therethrough, a front plate that is provided vertically on the bottom plate so as to guide a front edge face of the plurality of cards and has an opening through which the undermost one of the plurality of cards is ejected, the opening being provided at a lower portion of the front plate, and a left-and-right pair of side plates that are provided vertically on the bottom plate so as to guide a right and a left edge face of the plurality of cards, the side plates being orthogonal with the front plate; and a cassette cover having at least a top plate that opposes the bottom plate of the cassette body and serves to close an upper portion of the cassette cover, and a rear plate that suspends from the top plate and serves to close a rear portion of the cassette cover, the rear plate opposing the front plate of the cassette body. The card storage cassette is provided with a vertical guide means that restricts a two dimensional position of the cassette cover in relation to the cassette body and allows the cassette cover to vertically move in relation to the cassette body, the vertical guide means being located between the left-and-right pair of side plates of the cassette body and the rear plate of the cassette cover, so that while the cassette body and the cassette cover are framed into a box shape by use of the vertical guide means, the cassette cover is demountable from the cassette body along the vertical guide means.

A second aspect of the present invention provides a card storage cassette in which a plurality of cards are stored so that the plurality of cards are vertically stacked while the card face of the plurality of cards are maintained substantially horizontal and from which the undermost one of the plurality of cards can be ejected forward by rotation of a pick-up roller provided outside. The card storage cassette comprises a cassette body having a bottom plate on which the plurality of cards are vertically stacked while maintaining a card face of the cards substantially horizontal, the bottom plate allowing the pick-up roller to enter therethrough, a front plate that is provided vertically on the bottom plate so as to guide a front edge face of the plurality of cards and has an opening through which the undermost one of the plurality of cards is ejected, the opening being provided at a lower portion of the front plate, and a left-and-right pair of side plates that are provided vertically on the bottom plate so as to guide a right and a left edge face of the plurality of cards, the side plates being orthogonal with the front plate; and a cassette cover having at least a top plate that opposes the bottom plate of the cassette body and serves to close an upper portion of the cassette cover, and a rear plate that suspends from the top plate and serves to close a rear portion of the cassette cover, the rear plate opposing the front plate of the cassette body. The cassette body and the cassette cover are framed into a box shape by use of a vertical guide means that restricts a two dimensional position of the cassette cover in relation to the cassette body and allows the cassette cover to vertically move in relation to the cassette body, the cassette cover is demountable from the cassette body along the vertical guide means, the vertical guide means being located between the left-and-right pair of side plates of the cassette body and the rear plate of the cassette cover.

A third aspect of the present invention provides a card storage cassette in which a plurality of cards are stored so that the plurality of cards are vertically stacked while the card face of the plurality of cards are maintained substantially horizontal and from which the undermost one of the plurality of cards can be ejected forward by rotation of a pick-up roller provided outside. The card storage cassette comprises a cassette body having a bottom plate on which the plurality of cards are vertically stacked while maintaining a card face of the cards substantially horizontal, the bottom plate allowing the pick-up roller to enter therethrough, a front plate that is provided vertically on the bottom plate so as to guide a front edge face of the plurality of cards and has an opening through which the undermost one of the plurality of cards is ejected, the opening being provided at a lower portion of the front plate, and a left-and-right pair of side plates that are provided vertically on the bottom plate so as to guide a right and a left edge face of the plurality of cards, the side plates being orthogonal with the front plate, and a cassette cover having a top plate that opposes the bottom plate of the cassette body and serves to close an upper portion of the cassette cover, a rear plate that suspends from the top plate and serves to close a rear portion of the cassette cover, the rear plate opposing the front plate of the cassette body, and a left-and-right pair of side plates that suspend vertically from the top plate and supports a weight that abuts the uppermost one of the plurality of cards so that the weight is movable in a gravitational direction, the side plates being orthogonal with the rear plate. The cassette body and the cassette cover are framed into a box shape by use of a vertical guide means that restricts a two dimensional position of the cassette cover in relation to the cassette body and allows the cassette cover to vertically move in relation to the cassette body, the cassette cover is demountable from the cassette body along the vertical guide means, with the weight supported, the vertical guide means being located between the left-and-right pair of side plates of the cassette body and the rear plate of the cassette cover.

According to the card recording apparatus of the first aspect, the undermost one of a plurality of cards that are stacked vertically so that the card faces each are maintained substantially horizontal is ejected by rotation of the pick-up roller from the card storage cassette and then predetermined information is recorded on the ejected card. While the card storage cassette is framed into a box shape by joining the cassette body and the cassette cover by the aid of the vertical guide means, the cassette cover is detachable from the cassette body along the vertical guide means. Therefore, the cassette cover can be removed from the cassette body even when the undermost one of the plurality of cards stacked in the cassette body is being ejected, thereby facilitating a replenishment of the cards into the cassette body. Accordingly, the card storage cassette can provide an improved usability. In addition, the card recording apparatus can also provide an improved usability since the cassette cover can be removed while the card recording apparatus is recording predetermined information on the card.

According to the card storage cassette of the second aspect, the undermost one of a plurality of cards that are stacked vertically so that the card faces each are maintained substantially horizontal is ejected by rotation of the pick-up roller provided outside of the card storage cassette. While the card storage cassette is framed into a box shape by joining the cassette body and the cassette cover by the aid of the vertical guide means, the cassette cover is detachable from the cassette body along the vertical guide means. Therefore, the cassette cover can be removed from the cassette body even when the undermost one of the plurality of cards stacked in the cassette body is being ejected, thereby facilitating a replenishment of the cards into the cassette body. Accordingly, the card storage cassette can provide an improved usability.

According to the card storage cassette of the third aspect, the undermost one of a plurality of cards that are stacked vertically so that the card faces each are maintained substantially horizontal is ejected by rotation of the pick-up roller provided outside of the card storage cassette. Whereas the card storage cassette is framed into a box shape by joining the cassette body and the cassette cover by the aid of the vertical guide means and the weight that abuts the uppermost card is supported vertically movably in the cassette cover, the cassette cover is detachable from the cassette body along the vertical guide means while supporting the weight. Therefore, the cassette cover can be removed from the cassette body even when the undermost one of the plurality of cards stacked in the cassette body is being ejected, thereby facilitating a replenishment of the cards into the cassette body, as is the case with the card storage cassette of the second aspect. Moreover, when the cassette cover is attached on the cassette body, the weight that abuts the uppermost card presses the stack of the cards by the gravitational force applied thereto. Therefore, the undermost card is pressed down on the pick-up roller and thereby is assuredly ejected by rotation of the pick-up roller. In addition, when the cassette cover is removed from the cassette body, the weight is also removed along with the cassette cover, thereby enabling a replenishment of the cards without any problem.

BRIEF DESCRIPTION OF THE DRAWINGS

In the accompanying drawings:

FIG. 6 is an exploded perspective view of a card storage cassette according to a preferred embodiment of the present invention;

DESCRIPTION OF THE PREFERRED EMBODIMENTS

Referring to the accompanying drawings, embodiments of a card recording apparatus and a card storage cassette according to the present invention will be described hereinafter.

Embodiment

Figure 1:
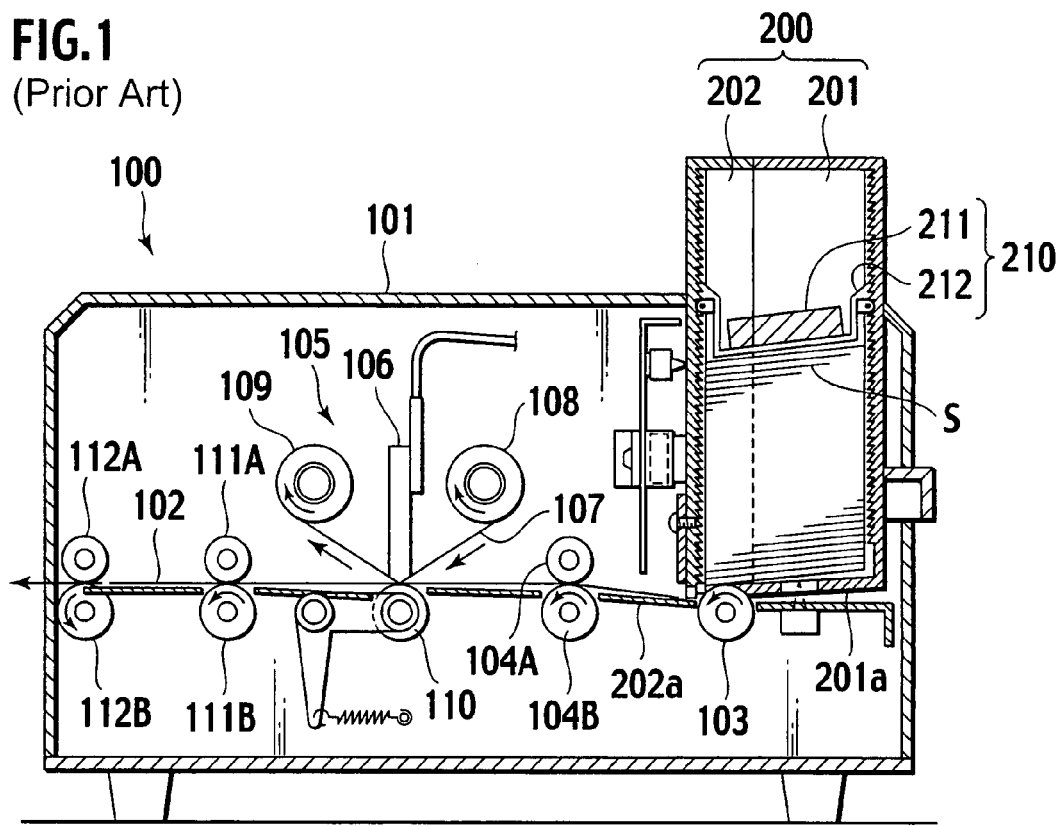
FIG. 1 is a schematic view of a related-art card printing apparatus and a sheet storage magazine.
Figure 2:
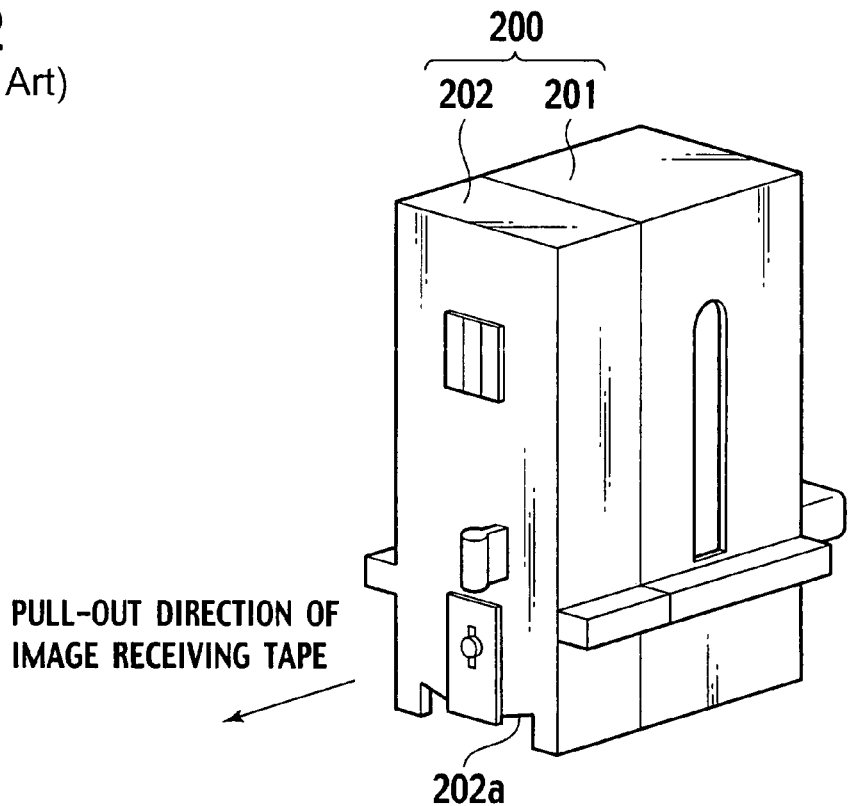
FIG. 2 is a perspective view of the related-art sheet storage magazine illustrated in FIG. 1.
Figure 3:
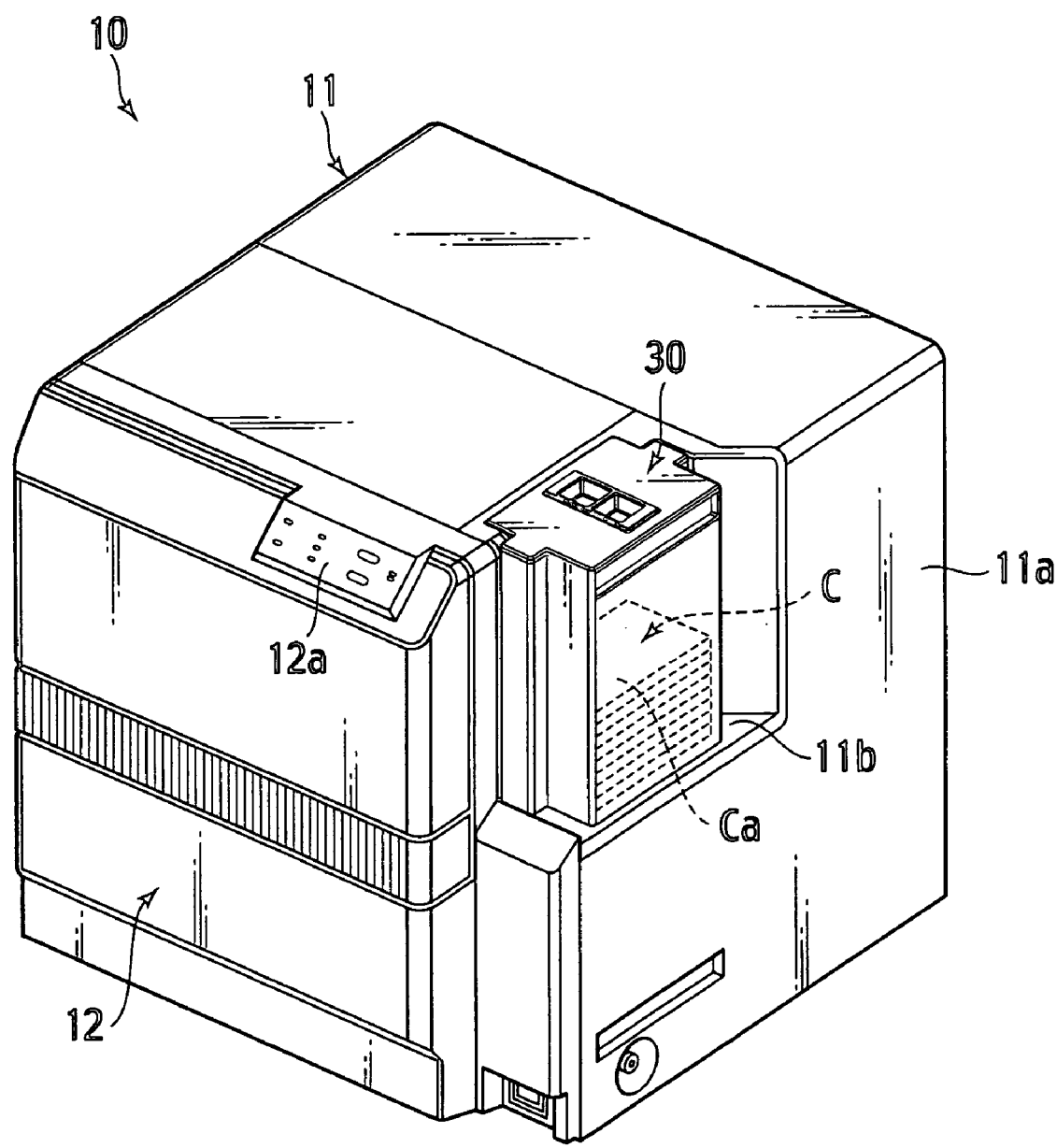
FIG. 3 is a perspective view of a card recording apparatus according to a preferred embodiment of the present invention, illustrating the card recording apparatus on which a card storage cassette according to this embodiment is mounted.

FIG. 3 is a perspective view of a card recording apparatus according to this embodiment, illustrating the card recording apparatus on which the card storage cassette according to this embodiment is mounted.

Figure 4:
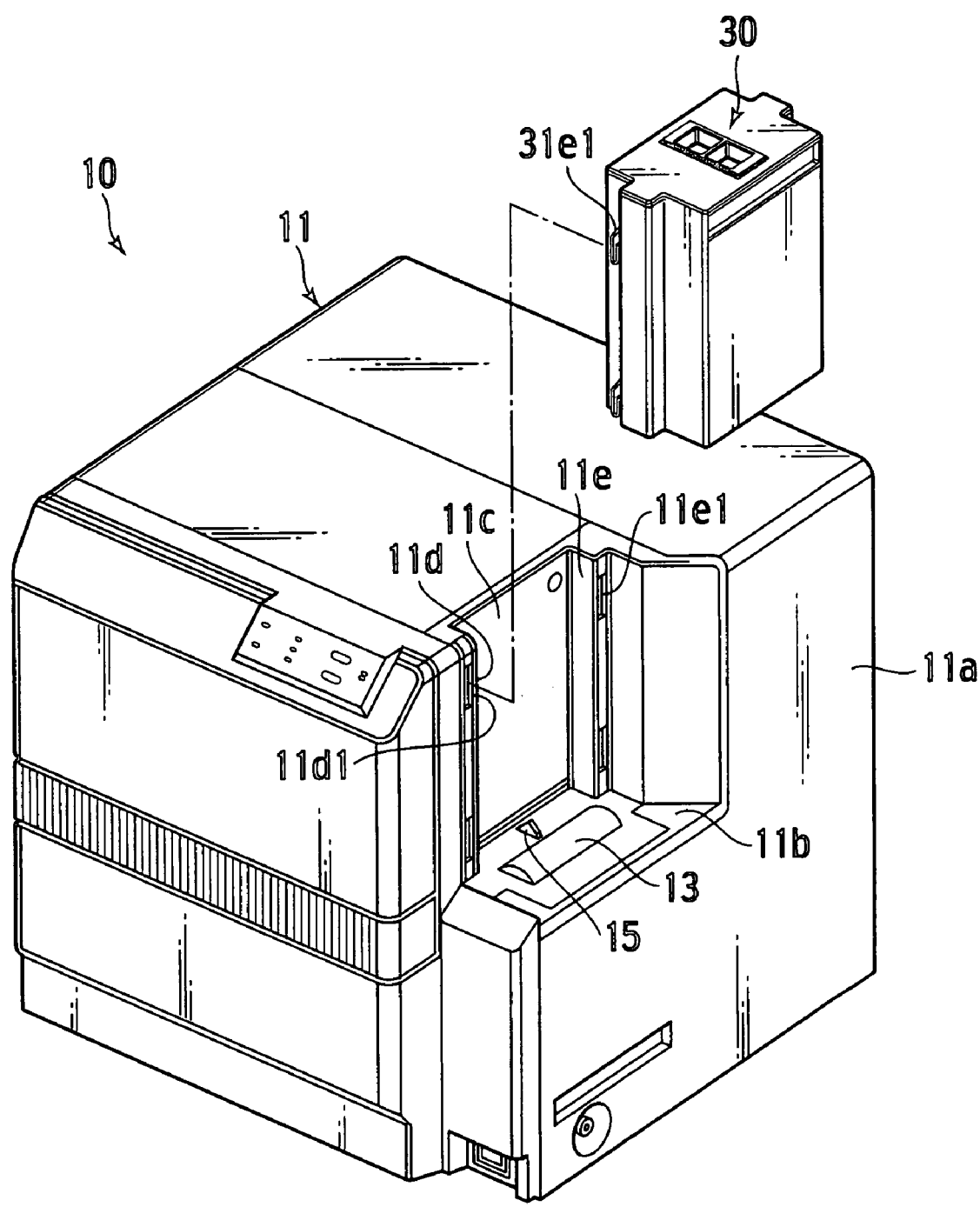
FIG. 4 is a perspective view of a card recording apparatus according to a preferred embodiment of the present invention, illustrating the card recording apparatus from which a card storage cassette according to this embodiment is removed.

FIG. 4 is a perspective view of a card recording apparatus according to this embodiment, illustrating the card recording apparatus from which the card storage cassette according to this embodiment is removed.

Figure 5:
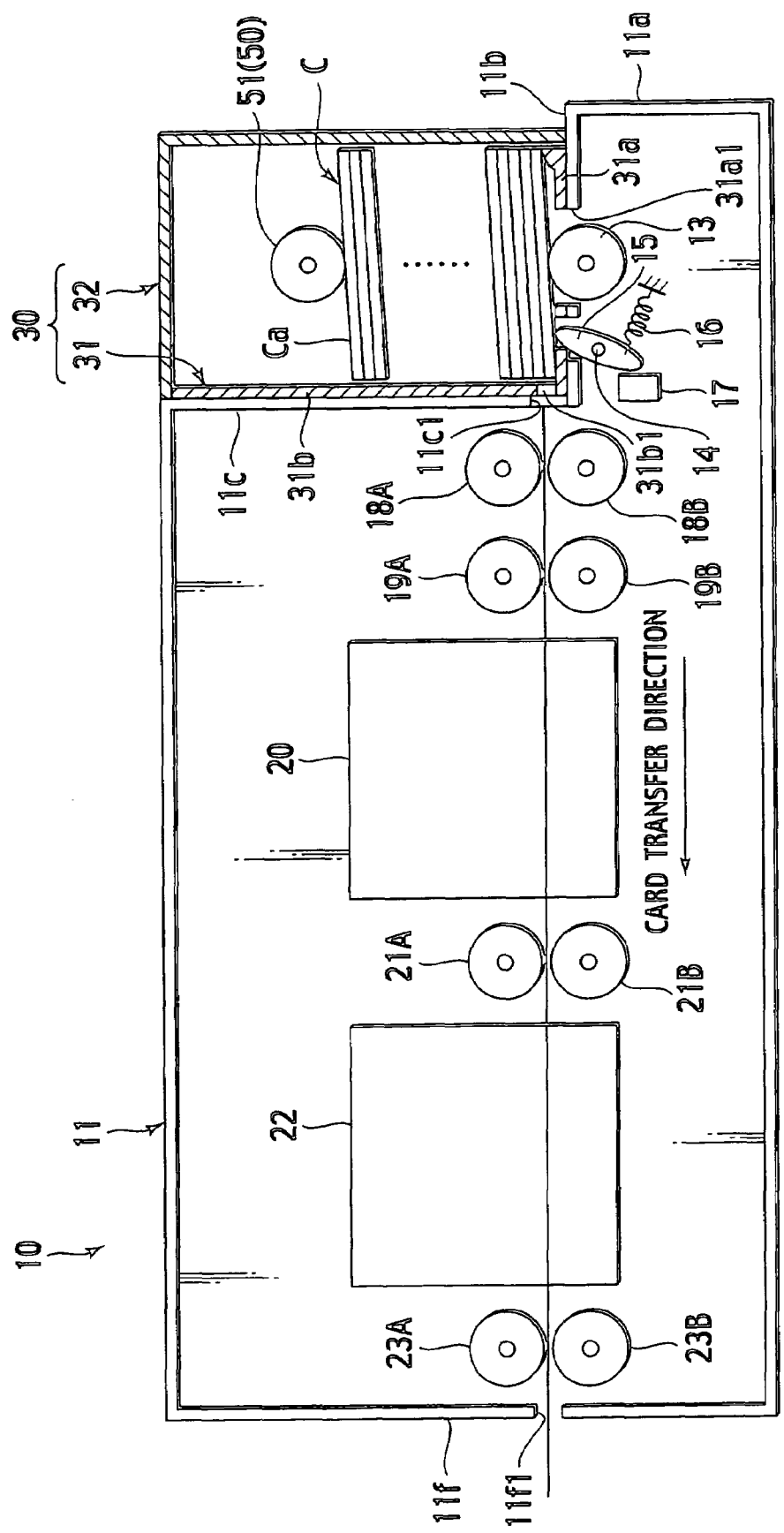
FIG. 5 is a cross-sectional view of a card recording apparatus and a card storage cassette according to a preferred embodiment of the present invention.

FIG. 5 is a cross-sectional view of a card recording apparatus and a card storage cassette according to this embodiment.

As shown in FIG. 3, a plurality of cards C are stored in piles in a vertical direction, which equals to a direction of the gravitational force, while a card face Ca is maintained substantially horizontal inside a card storage cassette 30 according to this embodiment which is suitable to be utilized in a card recording apparatus 10 according to this embodiment. A structure of the card storage cassette 30 according to this embodiment will be explained later.

The card storage cassette 30 is mounted on a trapezoidal cassette mount platform 11b that is formed as a result of making a recess portion in a right side plate 11a of an outer chassis 11 that serves as an exterior of the card recording apparatus 10. Therefore, the card storage cassette 30 is demountably mounted on the cassette mount platform 11b without opening the outer chassis 11.

In addition, there is attached a front panel 12 in the front of the outer chassis 11 of the card recording apparatus 10. Moreover, on the upper portion of the front panel 12 is provided an operation panel 12a. The operation panel 12 allows a user to set what needs to be printed, such as but not limited to characters, pictures, magnetic information or the like.

As shown in FIG. 4, there is provided a side plate 11c in the back of the recess formed in a part of the right side plate 11a of the outer chassis 11 of the card recording apparatus 10. The side plate 11c is perpendicular to the cassette mount platform 11b and parallel with the right side plate 11a. On both edges of the side plate 11c is provided a left-and-right pair of vertical guide walls 11*d*, 11*e* that are opposing with each other. On the upper and the lower portion of the guide walls 11*d*, 11*e* are provided rectangular slots 11*d*1, 11*e*1 that are directed toward the right side plate 11*a*.

On the other hand, there are provided inverse L-shaped locking claws 31*e*1, 31/1 (Refer to FIG. 7B for 31/1) that extend downward into an L shape. When the card storage cassette 30 is mounted on the card recorder 10, first, the cassette 30 is inclined slightly. Second, the inverse L-shaped locking claws 31*e*1, 31/1 are inserted into the corresponding slots 11*d*1, 11*e*1 formed on the upper and the lower portions of the left-and-right pair of the vertical guide walls 11*d*, 11*e*. Then, when the card storage cassette 31 is erected vertically, these inverse L-shaped locking claws 31*e*1, 31/1 lock assuredly into the slots 11*d*1, 11*e*1. As a result, the card storage cassette 30 is firmly mounted on the cassette mount platform 11*b*. At this time, the card storage cassette 30 is positioned by the side plate 11*c* of the outer chassis 11 and the left-and-right vertical guide walls 11*d*, 11*e*.

In the cassette mount platform 11*b* of the outer chassis 11, there are provided a rectangular opening 31*a*1 (described later) through which a part of a pick-up roller 13 is protruded and a slot through which a cassette detection lever 15 is protruded. The cassette detection lever 15 detects whether or not the card storage cassette 30 is mounted on the cassette mount platform 11*b*.

When explained more specifically with reference to FIG. 5, the card storage cassette 30 is demountably mounted on the cassette mount platform 11*b* that is formed to be exposed by making a recess in a part of the right side plate 11*a* of the outer chassis 11 of the card recording apparatus 10. The card storage cassette 30 is framed into a box shape by joining a cassette cover 32 into a cassette body 31 by the aid of a vertical guide member (described later). The cassette body 31 and the cassette cover 32 are horizontally separable with each other.

In the card storage cassette 30 framed into a box shape by combining the cassette cover 32 into the cassette body 31, a plurality of cards are stacked vertically on a bottom plate 31*a* of the cassette body 31 so that a flat card face Ca is maintained substantially horizontal.

In addition, the undermost card C of the plurality of cards C stacked vertically on the bottom plate 31*a* of the cassette body 31 abuts the pick-up roller 13 that is protruded upward through the opening 31*a*1 formed in the bottom plate 31*a* of the cassette body 31. On the other hand, on the uppermost card C of the plurality of cards C is placed a weight 51 of a weight member 50. By the gravity exerted on the weight 51, the undermost card C is pressed against the pick-up roller 13. By the way, the shape of the bottom plate of the cassette body 31 is not limited to the above-stated bottom plate 31*a* in this embodiment. Various shapes are possible as far as the bottom plate holds the plurality of cards C and allows a part of the pick-up roller 13 to protrude therethrough so as to abut the undermost card C.

For example, the card C used in this embodiment has a shorter edge (along the card transfer direction) of 54 mm, a longer edge (perpendicular to the direction) of 85.6 mm, and a thickness of 0.76 mm.

By the way, since the shorter edge of the card C is set along the card transfer direction in this embodiment, a card transfer distance becomes shorter and accordingly a transfer time becomes preferably shorter. However, the present invention is not limited to this embodiment. The longer edge of the card C can be along the card transfer direction.

One end of the cassette detection lever 15 that can pivot about an axis 14 abuts the undermost card C in the card storage cassette 30 by a biasing force exerted from a spring 16. On or near the other end is provided a cassette detection sensor 17 such as but not limited to an optical sensor or the like. With such a construction, the cassette detection sensor 17 can detect whether or not the card storage cassette 30 is mounted on the cassette mount platform 11*a*.

By a counter-clock-wise rotation of the pick-up roller 13, the undermost card C is pushed out one after another from a card outlet opening 31*b*1 that pierces through the lower portion of a front side plate 31*b* of the cassette body 31. Then, the pushed-out card C is transferred to a pair of cleaning rollers 18A, 18B after passing through a card hole 11*c*1 that pierces through the lower portion of the side plate 11*c* of the outer chassis 11. After the upper surface of the card C is cleaned by the pair of the cleaning rollers 18A, 18B, the card C is transferred to an encoder portion 20.

The above-mentioned encoder portion 20 has a function of writing information on a magnet stripe or an IC memory provided on a front and/or aback face. The card C that has been treated by the encoder portion 20 is transferred to a printing portion 22 through a pair of transfer rollers 21A, 21B.

The above-mentioned printing portion 22 is capable of printing such as but not limited to characters or facial portraits on the front face of the card C. The printing portion 22 can employ any printing method such as but not limited to a thermal transfer printing, an ink-jet printing or the like.

The card C on which characters or the like are printed by the printing portion 22 is ejected out from a card discharge port 11/1 provided on a left side plate 11*f* of the outer chassis 11 by the aid of a pair of discharge rollers 23A, 23B.

By the way, a laminator section (not shown) may be provided between the printing portion 22 and the pair of discharge rollers 23A, 23B. The laminator section can employ a thermo compressing method to laminate the card C that has passed through the printing portion 22 with a transparent sheet.

Next, a specific construction of the card storage cassette 30 according to this embodiment will be described hereinafter with reference to FIGS. 6 to 8.

FIG. 6 is an exploded perspective view of a card storage cassette according to this embodiment.

Figure 7A:
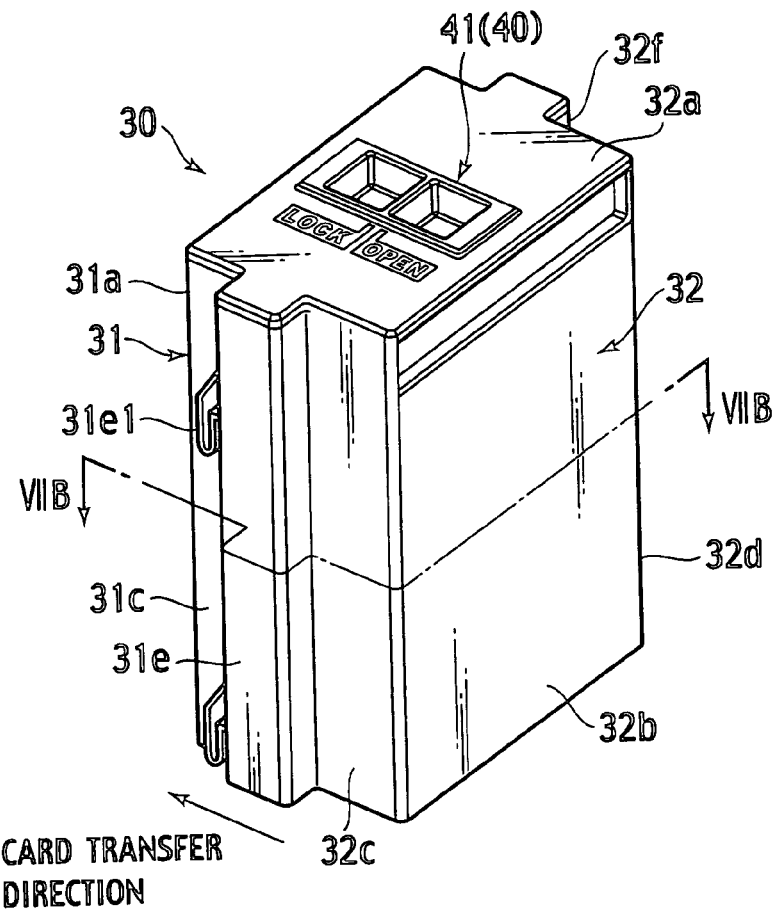
FIG. 7A is a perspective view of a card storage cassette according to a preferred embodiment of the present invention.
Figure 7B:
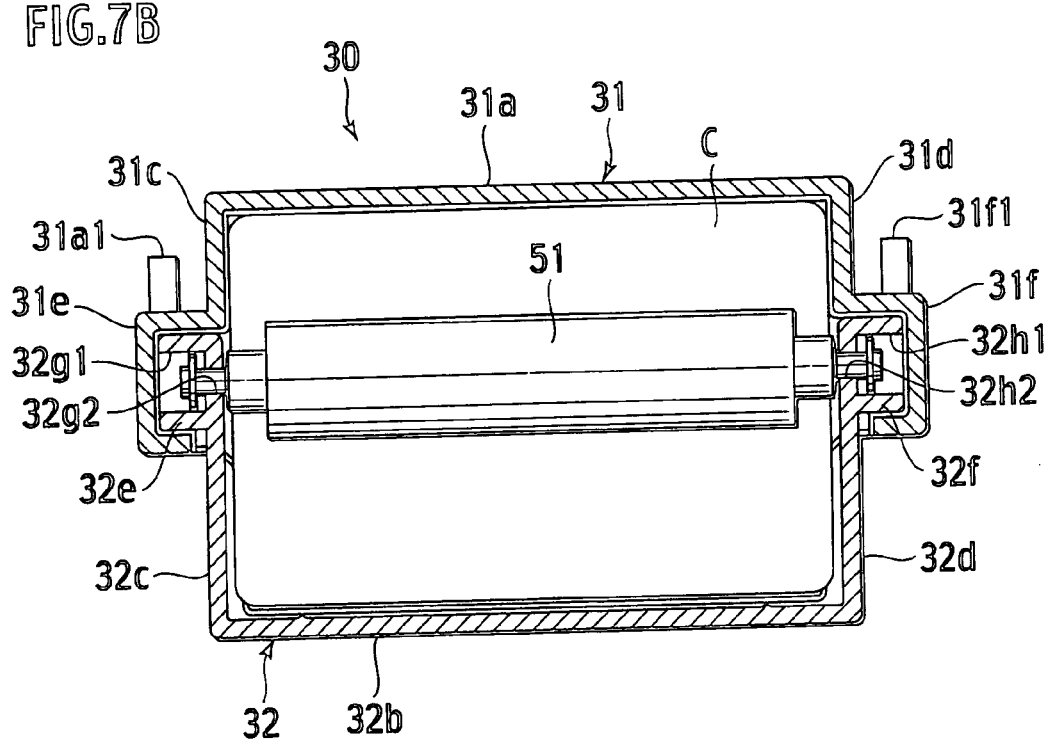
FIG. 7B is a cross-sectional view of the card storage cassette illustrated in FIG. 7A taken along line VIIB-VIIB of FIG. 7A.

FIG. 7A is a perspective view of an as-framed card storage cassette according to this embodiment. FIG. 7B is a cross-sectional view of the card storage cassette illustrated in FIG. 7A taken along line VIIB-VIIB of FIG. 7A.

Figure 8:
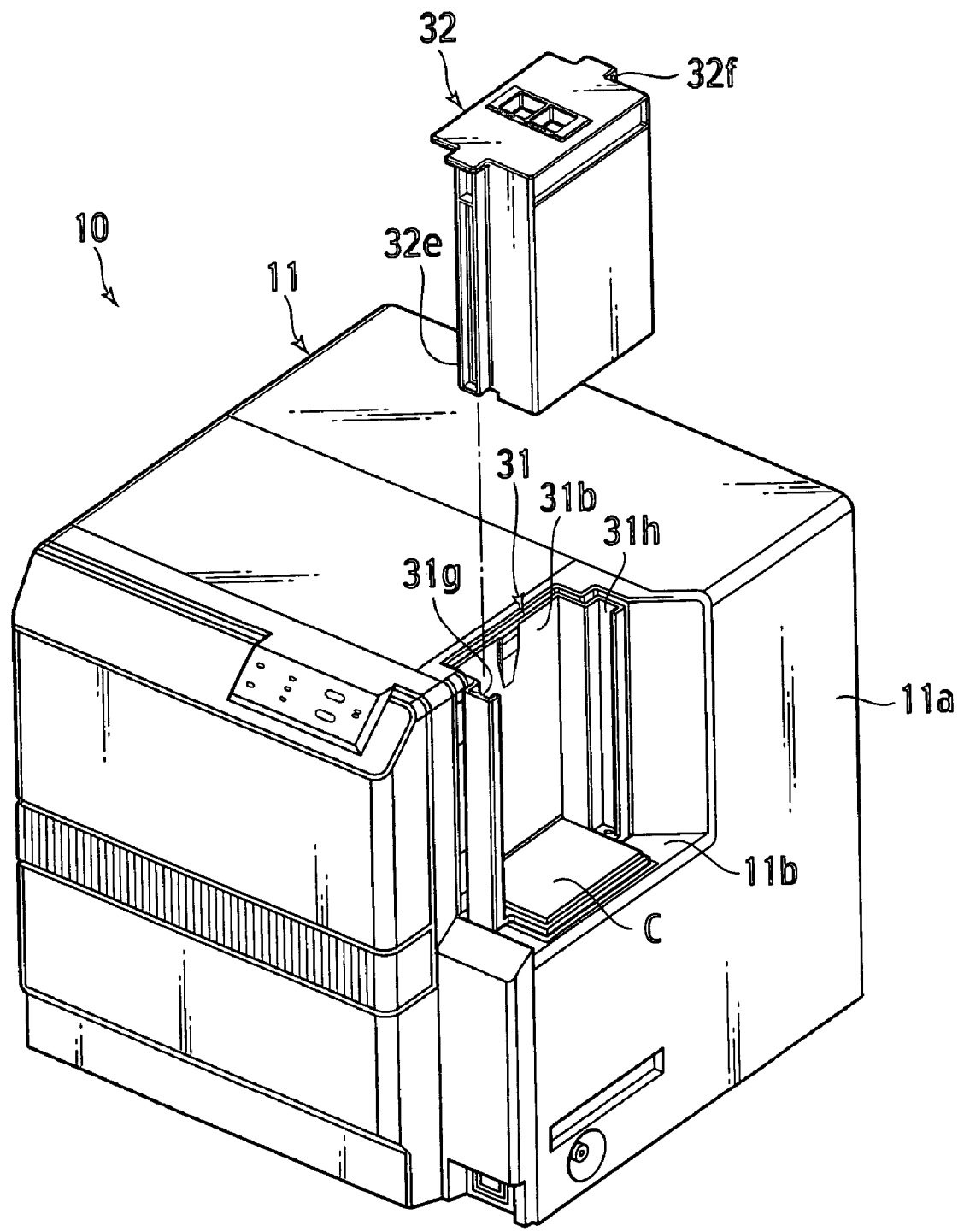
FIG. 8 is a perspective view of a card recording apparatus according to a preferred embodiment of the present invention and a card storage cassette according to a preferred embodiment of the present invention, wherein a cassette cover is removed from a cassette body while the cassette body remains on the card recording apparatus.

FIG. 8 is a perspective view of a card recording apparatus according to this embodiment and a card storage cassette according to this embodiment, wherein a cassette cover is removed from a cassette body while only the cassette body is mounted on the card recording apparatus.

The card storage cassette 30 according to this embodiment is configured so as to be applicable to the case where a plurality of cards having desired information recorded thereon are produced or where various cards are automatically provided to a user. Although the card storage cassette 30 is preferable to the above-stated card recording apparatus 10 (FIGS. 3 to 5), the cassette 30 can be used in other apparatus for such purposes.

While the above-mentioned card storage cassette 30 is framed into a box shape by combining the cassette-cover 32 and the cassette body 31 by the aid of a vertical guide member, it is noteworthy that the cassette cover 32 can be removed from the cassette body 31 along the vertical guide member.

More specifically, the cassette body 31 is produced into a single member by using, for example, a light-blue colored resin that allows the inside of the cassette body 31 to be seen.

The cassette body 31 is composed of a bottom plate 31a, a front plate 31b formed perpendicularly on the bottom plate 31a, a left side plate 31c formed perpendicularly on the bottom plate 31a so as to be orthogonal to the front plate 31b, a right side plate 31d formed perpendicularly on the bottom plate 31a so as to be orthogonal to the front plate 31b, a left vertical guide wall 31e that is formed so as to have a contact with the left side plate 31c and extend convexly in relation to the left side plate 31c, and a right vertical guide wall 31f that is formed so as to have a contact with the right side plate 31d and extend convexly in relation to the right side plate 31d. In a space surrounded by the bottom plate 31a, the front plate 31b, the left side plate 31c, and the right side plate 31d, a plurality of cards C are stacked vertically so that a flat card face Ca is maintained substantially horizontal. The rear portion of the cassette body 31, which opposes the front plate 31b, has an opening. In addition, the front plate 31b serves as a guide for the front edge of the plurality of cards C stacked vertically on the bottom plate 31a. The left side plate 31c and the right side plate 31d serve as a guide for the left edge and the right edge of the plurality of cards C stacked vertically on the bottom plate 31a, respectively.

The bottom plate 31a of the cassette body 31 has an opening 31a1 that allows at least a part of the pick-up roller 13 (FIGS. 4 and 5) provided outside of the cassette body 31 to partly enter therethrough and an opening 31a2 that allows the card detection lever 15 for detecting the presence of the card C to enter therethrough. Moreover, on the bottom plate 31, a protrusion 31a3 is formed so as to have a slight height that raises a rear end portion of the lowermost card C among the plurality of the stacked cards C. Since the protrusion 31a3 has so small a height that the lowermost card C and the other cards C thereon are held substantially horizontal. Furthermore, there are provided a left-and-right pair of positioning holes 31a4, 31a4 in the bottom plate 31a. Note that only one positioning hole 31a4 near the vertical guide wall 31f is shown in FIG. 6. Into the positioning holes 31a4, 31a4 are fitted a left-and-right pair of positioning pins 32e1, 32f1 provided at the lowermost portion of a left-and-right pair of convex-shaped vertical guide wall 32e, 32f (described later). Note that only the positioning pin 32e1 is shown in FIG. 6.

The cards C are stacked on the bottom plate 31a of the cassette body 31 so that the shorter edge of the cards C is set along the card transfer direction.

The front plate 31b of the cassette body 31 is positioned at an upstream side of the transfer direction of the cards C stacked on the bottom plate 31a. At the undermost portion of the front plate 31b is provided a slit 31b1 that allows the undermost card C to be ejected by rotation of the pick-up roller 13 (FIG. 5) provided outside. The height of the slit 31b1 is preferably determined so that only the undermost card C can be ejected. However, there can be provided a function for ejecting only the undermost card C on the card recording apparatus 10 (FIGS. 1 to 5). In this case, it is sufficient that the slit 31b1 provided at the undermost portion of the front plate 31b of the cassette body 31 allows the undermost card C to be discharged out.

Furthermore, at a top portion of the front plate 31b of the cassette body 31, there is pierced a locking hole 31b2 for locking the cassette cover 32 on the cassette body 31. The shape of the locking hole 31b2 will be described later.

The left side plate 31c and the right side plate 31d, which form the left-and-right pair opposing each other, are provided so that they are in an orthogonal relation to the front plate 31b of the cassette body 31. The distance between the left side plate 31c and the right side plate 31d is set to be slightly larger than the length of the longer edge of the card C.

The convexly extended vertical guide walls 31e, 31f that have a contact with the rear portion of the left side plate 31c and the right side plate 31d, respectively, are opposing each other to form a left-and-right pair. In other words, the vertical guide walls 31e, 31f are symmetrical with each other. On the front edge of each vertical guide wall 31e, 31f, an upper-and-lower pair of inverse L-shaped locking claws 31e1, 31f1 that extend downward, respectively. It should be noted that only locking claw 31e1 is shown in FIG. 7B. The card storage cassette 30 is mounted on the cassette mount platform 11b of the card recording apparatus 11. At this time, the front plate 31b, the left vertical guide wall 31e, and the right vertical guide wall 31f of the cassette body 31 cooperate with the side plate 11c, the left vertical guide wall 11d, and the right vertical guide wall 11e, respectively, to position the card storage cassette 30 in relation to the card printing apparatus 10 and the inverse L-shaped locking claws 31e1, 31f1 are engaged with rectangular slots 11d1, 11e1, respectively.

In addition, corresponding to the left-and-right pair of the vertical guide walls 31e, 31f being outwardly convex, the inner wall of each vertical guide walls 31e, 31f is concavely shaped so as to serve as concave-shaped vertical guide grooves 31g, 31h that are symmetrically opposing each other to constitute a pair. The distance between the pair of the concave-shaped vertical guide grooves 31g, 31h is determined so that a left-and-right pair of convex-shaped vertical guide walls 32e, 32f (described later) provided in the cassette cover 32 can be fitly engaged with these grooves 31e, 31f.

By the way, the cassette cover 32 is produced into a single member by using, for example, a light-blue colored resin that allows the inside of the cassette cover 32 to be seen, as is the case with the cassette body 31.

The cassette cover 32 is composed of a top plate 32a that is configured to oppose the bottom plate 31a of the cassette body 31 and to constitute the upper portion of the cassette cover 32, a rear plate 32b that is configured to suspend from the top plate 32a and to constitute the back portion of the cassette cover 32, a left side plate 32c that is configured to suspend from the top plate 32a and to be orthogonal to the rear plate 32b, a right side plate 32d that is configure to suspend from the top plate 32a and to be orthogonal to the rear plate 32b, the convex-shaped vertical guide wall 32e that is configured to meet the edge of the left side plate 32c and to extend outward, and the convex-shaped vertical guide wall 32f that is configured to meet the edge of the left side plate 32d and to extend outward. The left side plate 32c and the right side plate 32d form a left-and-right pair, while the convex-shaped vertical guide walls 32e, 32f form a left-and-right pair.

In addition, in a center portion of the top plate 32a of the cassette cover 32 is formed a concave-shaped bottomed opening 32a1. In the opening 32a1 is slidably fitted a slide member (lock/unlock member) 41 of a lock/unlock means 40 for locking/unlocking the cassette cover 32 on the cassette body 31. The slide member 41 is capable of sliding in directions of X1 and X2. The directions X1 and X2 run along the shorter edge of the card C. The slide member 41 is connected with a pressing plate 42 that abuts the reverse face of the bottom plate portion 32a1-1 by a screw 43 in a manner that holds the bottom plate portion 32a1-1 interposed therebetween. The lock/unlock means 40 will be detailed later.

The left-and-right pair of the left side plate 32c and the right side plate 32d are provided orthogonally on the left and the right edge of the rear plate 32b of the cassette cover 32, respectively. The inner spacing between the left-and-right pair of the left side plate 32c and the right side plate 32d is slightly longer than the longer edge of the card C.

The left-and-right pair of the convex-shaped vertical guide walls 32e, 32f are connected with the front portion of the left-and-right pair of the left side plate 32c and the right side plate 32d and expand outwardly from the left side plate 32c and the right side plate 32d, respectively. The left-and-right pair of the convex-shaped vertical guide walls 32e, 32f oppose symmetrically with each other.

When the left-and-right pair of the convex-shaped vertical guide walls 32e, 32f of the cassette cover 32 are inserted vertically slidably into the left-and-right pair of the concave-shaped vertical guide grooves 31g, 31h, the cassette cover 32 is fitted into the cassette body 31 to form a box shape.

On the other hand, when the cassette cover 32 is raised upward that has once been engaged so that the left-and-right pair of convex-shaped vertical guide walls 32e, 32f are fitted vertically along the left-and-right pair of concave-shaped vertical guide grooves 31g, 31h, the cassette cover 32 can be removed freely from the cassette body 31.

Namely, the left-and-right pair of concave-shaped vertical guide grooves 31g, 31h of the cassette body 31, which are respectively formed on the edge of the left-and-right pair of the left side plate 31c and the right side plate 31d, and the left-and-right pair of convex-shaped vertical guide walls 32e, 32f of the cassette cover 32, which are respectively formed on the edge of the left-and-right pair of the left side plate 32c and the right side plate 32d, serve as vertical guide means that restricts a two-dimensional position of the cassette cover 32 in relation to the cassette body 31 and allows vertical movement of the cassette cover 32. By the way, the vertical guide means stated above is not necessarily limited to the above structure. The means can be formed into any form as far as it can restrict a two-dimensional position of the cassette cover 32 and allows a vertical movement of the cassette cover 32 in relation to the cassette body 31.

According to the above structure of the card storage cassette 30, the cassette cover 32 can be removed from the cassette body 31, thereby enabling the cards C to be replenished into the cassette body 31 even when the undermost card C of the plurality of cards C stacked in the cassette body 31 is being ejected one after another by the pick-up roller 13 provided outside of the card storage cassette 30. Therefore, the card storage cassette 30 can provide an improved usability.

In addition, the convex-shaped vertical guide walls 32e, 32f of the cassette cover 32 have concave portions 32g1, 32h1, respectively. The concave portions 32g1, 32h1 extend in a longitudinal direction of the convex-shaped vertical guide walls 32e, 32f. At the bottom of the concave portions 32g1, 32h1, there are formed vertical guide slits 32g2, 32h2 that extends along the convex-shaped vertical guide walls 32e, 32f. The width of the concave portions 32g1, 32h1 is larger than that of the vertical guide slits 32g2, 32h2. The concave portions 32g1, 32h1 oppose each other to become a pair and the vertical guide slits 32g2, 32h2 oppose each other to become a pair.

The pair of the concave portions 32g1, 32h1 and the pair of the vertical guide slits 32g2, 32h2 serve as weight guiding means that slidably supports a weight means.

A weight 51 of the aforementioned weight means 50 is obtained by machining a stain-less steel rod. The weight 51 has a larger diameter portion 51a and smaller diameter portions 51b, 51b that are respectively formed at both ends of the larger diameter portion 51. The larger diameter portion 51a has a length corresponding to the longer edge length of the card C while the smaller diameter portions 51b each has a shorter length. The smaller diameter portion 51b passes through the vertical guide slits 32g2, 32h2 and has an E-washer 52 at the end portion thereof, thereby preventing the smaller diameter portion 51b from being removed from the vertical guide slits 32g1, 32h1. Due to such a construction, the smaller diameter portion 51b can move vertically along the convex-shaped vertical guide walls 32e, 32f and thus so the weight means 51 does.

The weight 51 can slide in a direction of the gravitational force to abut the uppermost card C of the plurality of cards C stacked on the cassette body 31. Since the weight 51 presses the plurality of cards C by aid of the gravitational force exerted on the weight 51, thereby pressing the undermost card C onto the pick-up roller 13 (FIG. 5). Therefore, the undermost card C can be assuredly ejected by the pick-up roller 13 (FIG. 5) provided outside of the cassette body 31.

Moreover, when the cassette cover 32 is removed from the cassette body 31, the weight 51 is removed at the same time because it is supported by the cassette cover 32, thereby enabling replenishment of the cards C without any trouble.

When the cassette body 31 and the cassette cover 32 are framed into a box shape as mentioned above, the card storage cassette 30 according to this embodiment is obtained as shown in FIGS. 7A, 7B.

As shown in FIG. 8, the card storage cassette 30 is mounted on the cassette mount platform 11a that has been provided by making the recess in the right side plate 11a of the outer chassis 11. The cassette cover 32 can be removed by raising the cover 32 in a way that the left-and-right pair of the convex-shaped vertical guide walls 32e, 32f provided in the cover 32 slide upward along the left-and-right pair of the concave-shaped vertical guide grooves 31g, 31h, while the cassette body 31 remains on the platform 11b. At this time, the cards C can be replenished into the cassette body 31. By the way, the cassette body 31 and the cassette cover 32 are made of a blue-colored resin through which the inside thereof can be seen from outside, thereby allowing a user to easily recognize the remainder of the cards C at sight.

Next, in the card storage cassette 30 according to this embodiment, a structure and an operation of the lock/unlock means 40 that locks/unlocks the cassette cover 32 to/from the cassette body 31 will be described hereinafter with reference to FIGS. 9 to 12.

Figure 9:
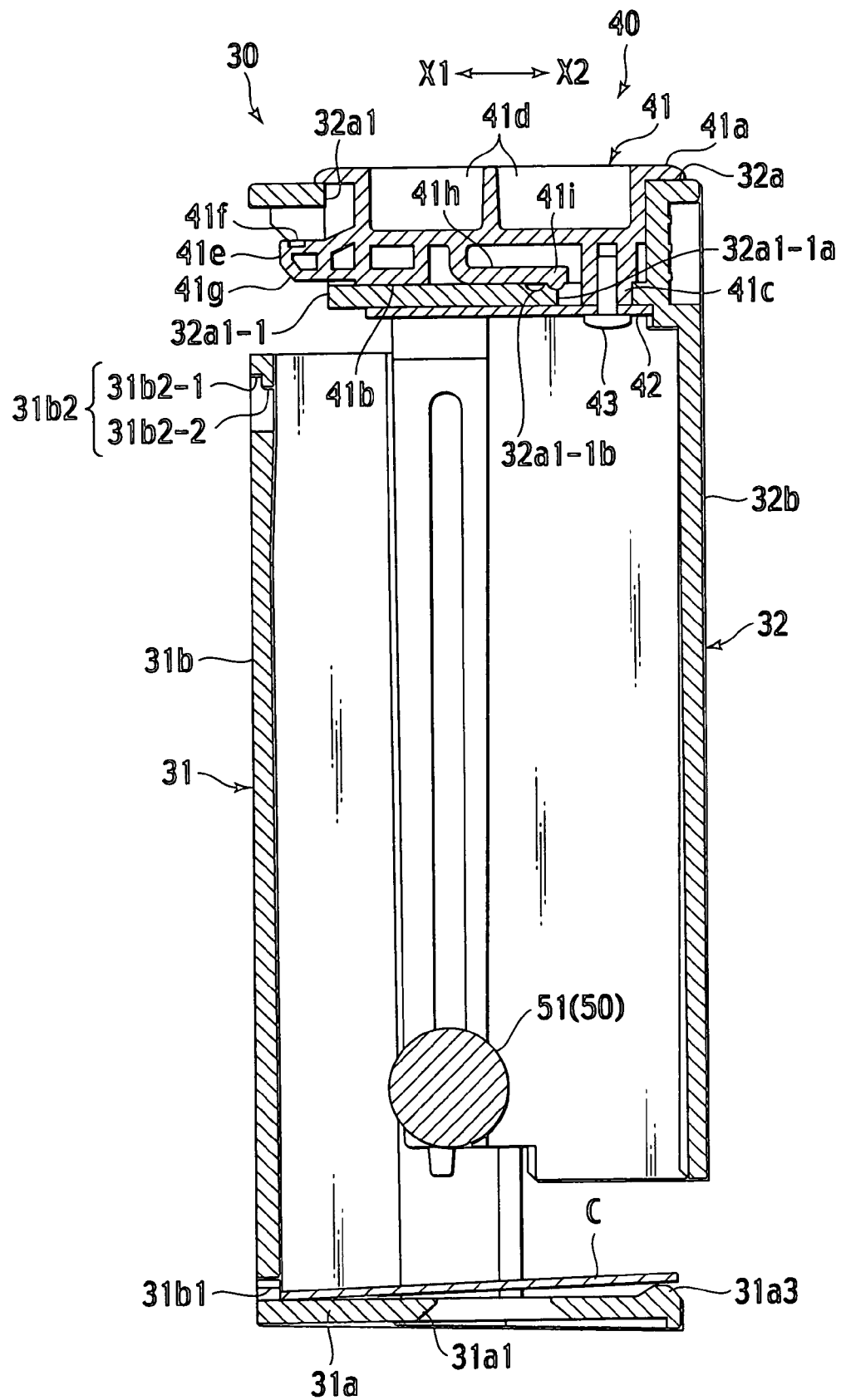
FIG. 9 is a vertical cross-sectional view illustrating a structure and its first operation of a lock/unlock means that locks/unlocks the cassette cover to/from a cassette body in the card storage cassette according to a preferred embodiment of the present invention.

FIG. 9 is a vertical cross-sectional view of a structure and its first operation of the lock/unlock means that locks/unlocks the cassette cover to/from the cassette body in the card storage cassette according to this embodiment.

Figure 10:
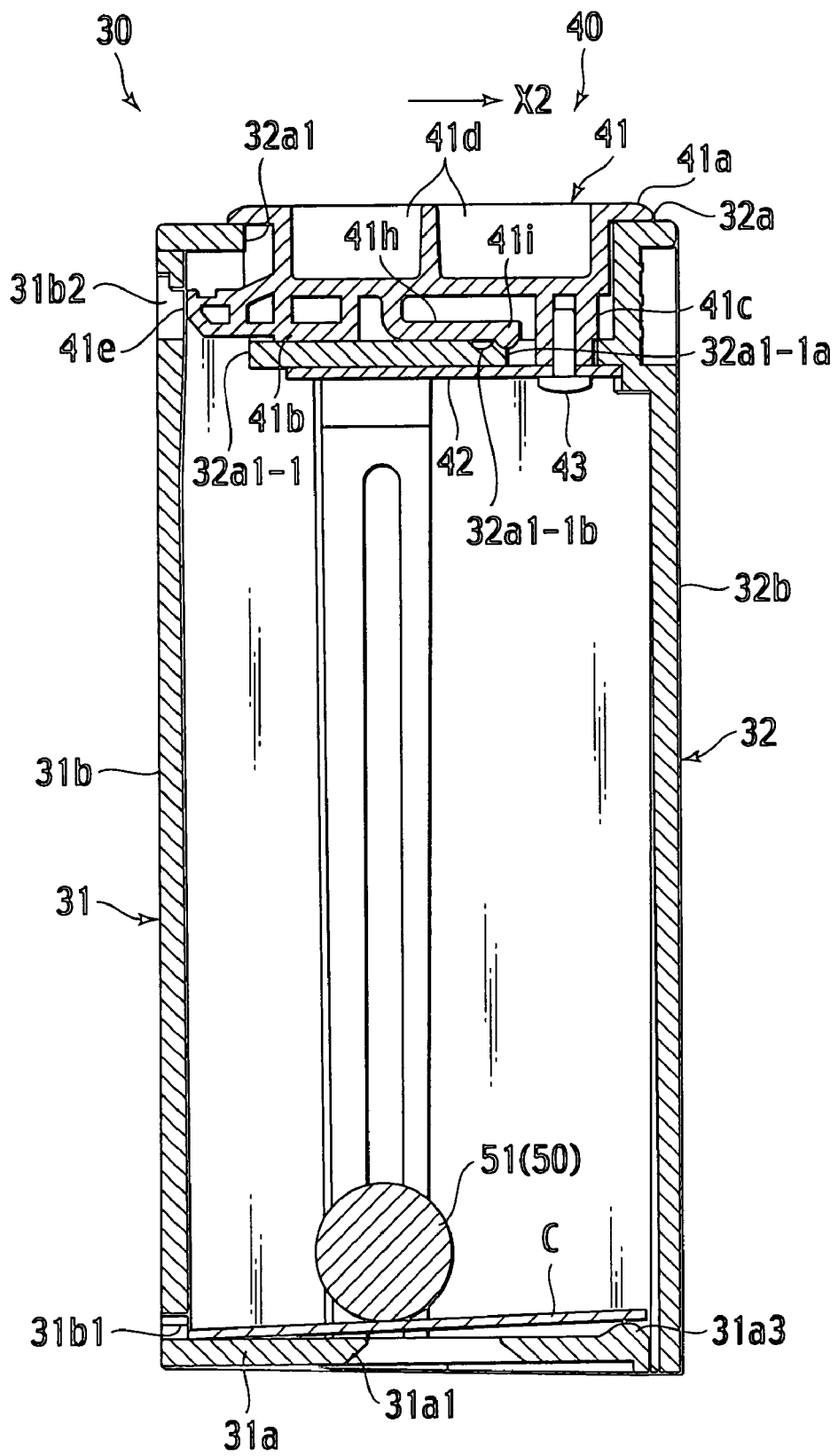
FIG. 10 is a vertical cross-sectional view illustrating a second operation of a lock/unlock means that locks/unlocks the cassette cover to/from the cassette body in the card storage cassette according to a preferred embodiment of the present invention.

FIG. 10 is a vertical cross-sectional view of a second operation of the lock/unlock means that locks/unlocks the cassette cover to/from the cassette body in the card storage cassette according to this embodiment.

Figure 11:
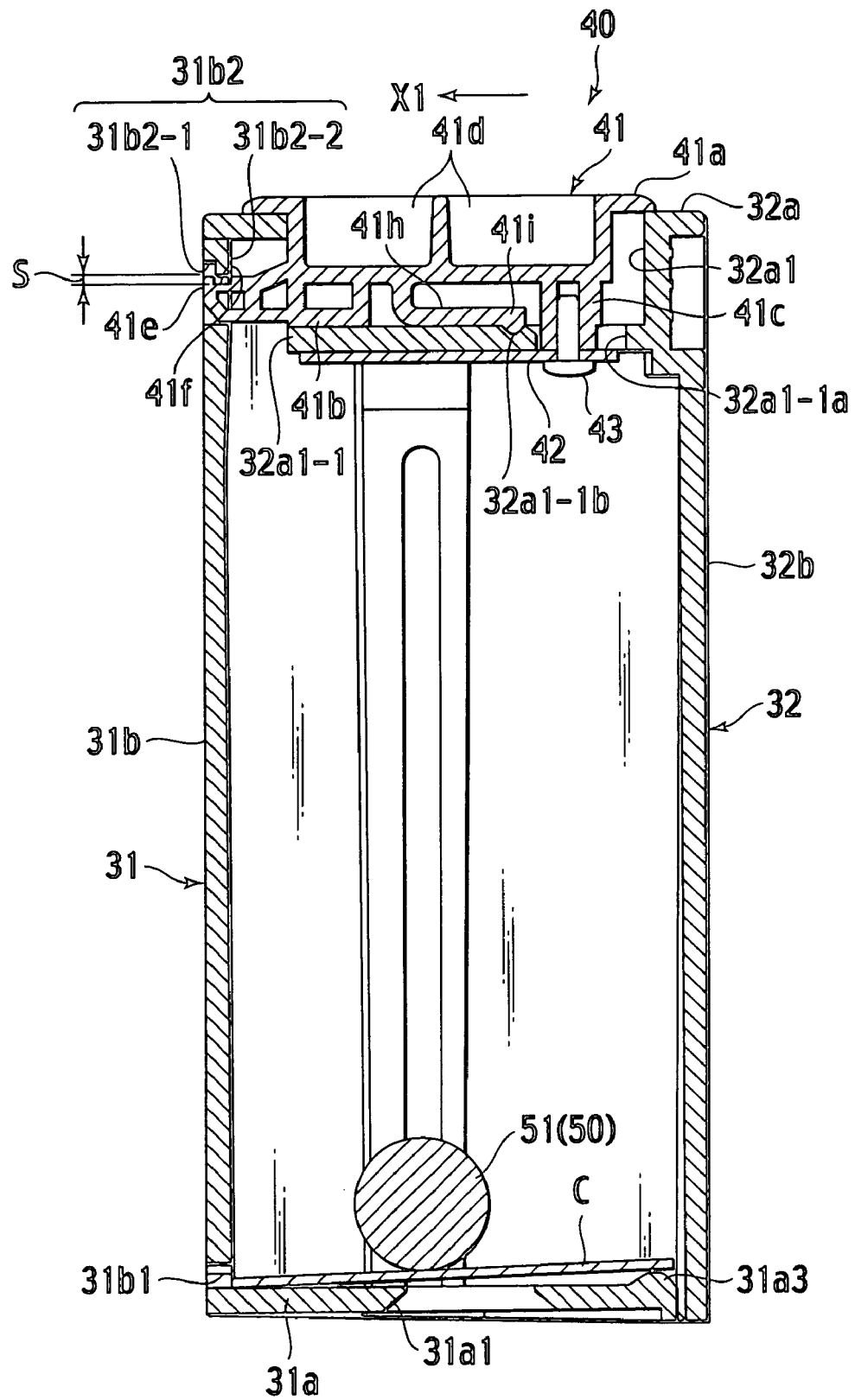
FIG. 11 is a vertical cross-sectional view illustrating a third operation of the lock/unlock means that locks/unlocks the cassette cover to/from the cassette body in the card storage cassette according to a preferred embodiment of the present invention.

FIG. 11 is a vertical cross-sectional view of a third operation of the lock/unlock means that locks/unlocks the cassette cover to/from the cassette body in the card storage cassette according to this embodiment.

Figure 12:
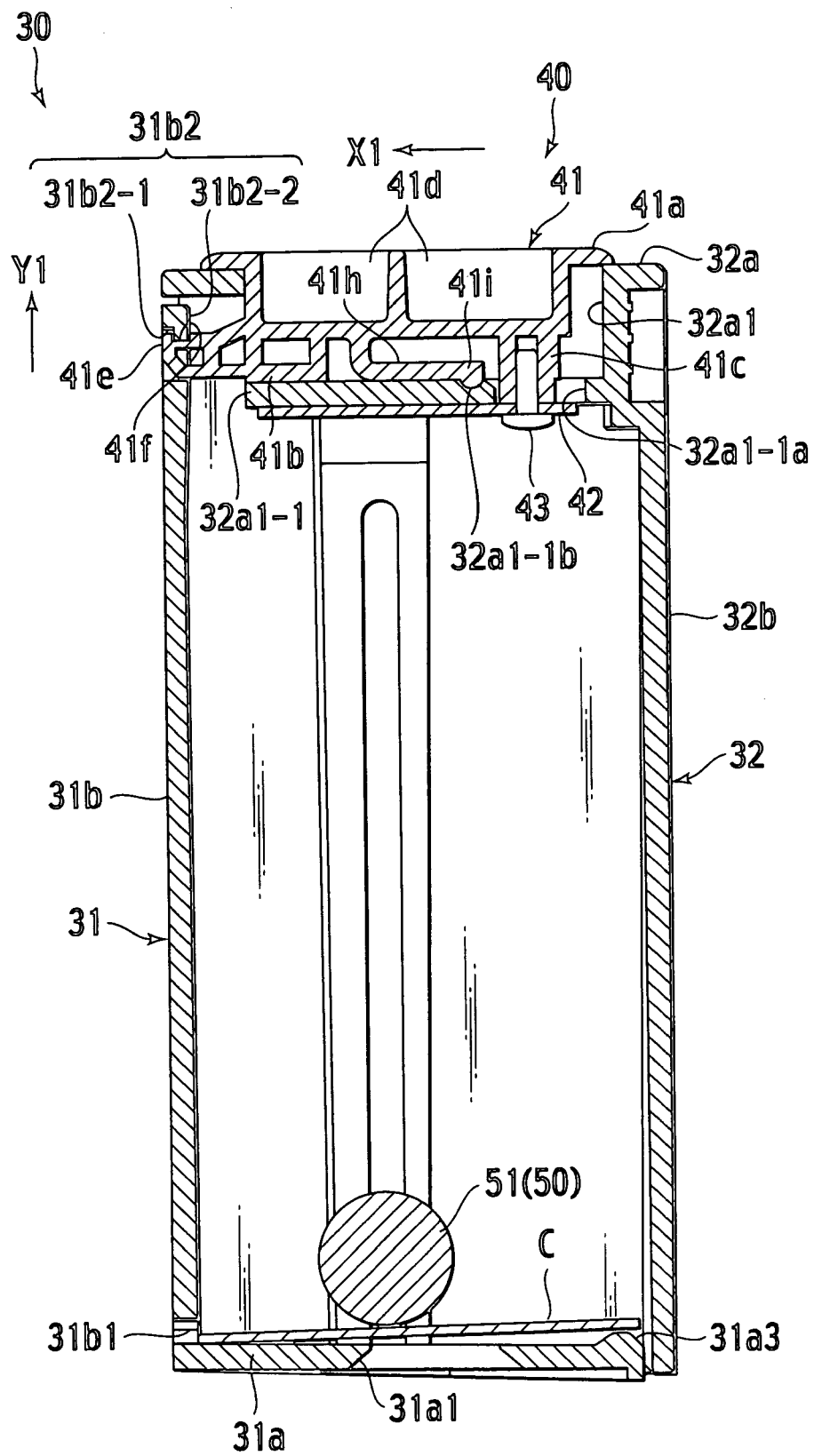
FIG. 12 is a vertical cross-sectional view illustrating a fourth operation of the lock/unlock means that locks/unlocks the cassette cover to/from the cassette body in the card storage cassette according to a preferred embodiment of the present invention.

FIG. 12 is a vertical cross-sectional view of a fourth operation of the lock/unlock means that locks/unlocks the cassette cover to/from the cassette body in the card storage cassette according to this embodiment.

FIG. 9 illustrates that the cassette cover 32 is moving upward against the cassette body 31 of the card storage cassette 30, while the weight 51 of the weight means 50 is supported by the cassette cover 32.

The lock/unlock means 40 that locks/unlocks the cassette cover 32 to/from the cassette body 31 is composed of elements provided on both the cassette body 31 and the cassette cover 32.

First, the elements provided on the cassette body 31 so as to be a part of the lock/unlock means 40 are described. The lock/unlock means 40 includes the locking hole 31b2 that pierces through an upper portion of the front plate 31b of the cassette body 31. The locking hole 31b2 has a step at the upper portion thereof, the step being formed by a combination of a first locking hole portion 31b1-1 and a second locking hole portion 31b-2. The first hole portion 31b-1 has a larger height than the second hole portion 31b-2, the height being defined as a distance between the upper and the bottom edge of the locking hole 31b2. In addition, the first hole portion 31b-1 is formed in the outer side of the front plate 31b.

Then, the elements provided on the cassette cover 32 so as to be a part of the lock/unlock means 40 are described. The lock/unlock means 40 includes a slide member (lock/unlock member) 41 that is integrally formed of a resin. The slide member 41 is engaged into the concave-shaped bottomed opening 32a1 formed in the center portion of the top plate 32a of the cassette cover 32. The slide member 41 is slidable within a predetermined margin in the directions of X1 and X2, the directions running along the shorter edge of the card C.

The slide member 41 has a flange portion 41a at the upper portion thereof. The flange portion 41a is formed into a rectangular shape that is slightly larger than the bottomed opening 32a1. The slide member 41 slides while the reverse face of the flange portion 41a abuts the top plate of the cassette cover 32 and at the same time the bottom portion 41b of the slide member 41 abuts the bottom plate portion 32a1-1 of the concave-shaped bottomed opening 32a1.

In the bottom plate portion 32a1-1 of the concave-shaped bottomed opening 32a1 of the cassette cover 32, a relief hole 32a1-1a for sliding is provided so as to pierce through the bottom plate portion 32a1-1. Into this relief hole 32a1-1a is inserted a boss portion 41c on one end portion of the slide member 41. To this boss portion 42 is fastened the pressing plate 42 that abuts the reverse face of the bottom plate portion 32a1-1 by use of a screw 43. With this structure, the slide member 41 and the pressing plate 42 are slidable in unison in the directions of X1 and X2 while the bottom plate portion 32a1-1 of the concave-shaped bottomed opening 32a1 is sandwiched therebetween.

In addition, there are provided two recess portions 41d, 41d arranged side-by-side along the directions of X1 and X2 in the center portion of the flange portion 41a formed at the upper portion of the slide member 41. These two recess portions 41d, 41d are used when the slide member 41 and the pressing plate 42 are manually slid in concert by a user. Namely, a user can insert his or her fingers into the recess portions 41d and slide the slide member 41 in the directions of X1 or X2.

At the front end of the slide member 41, a hook portion 41e extends along the direction of X1. On the upper face of the hook portion 41e is formed a slightly shallow recess portion 41f. The lower front of the hook portion 41e has a taper 41g (FIG. 9) so that the hook portion 41e can easily be inserted into the locking hole 31b2 provided by piercing the upper portion of the front plate 31b of the cassette body 31. Namely, the hook portion 41e is inserted into the locking hole 31b2 that pierces through the front plate 31b of the cassette body 31 when the slide member 41 slides leftward along the direction of X1.

In addition, in the lower portion of the slide member 41 is provided a L-shaped arm piece 41h in substantially the center of the slide member 41. The L-shaped arm piece 41h is short in the vertical direction and long in the horizontal direction (in the directions of X1 and X2). The L-shaped arm piece 41h can be elastically deformed in a vertical direction, which is caused by elasticity inherent to the resin material. The L-shaped arm piece 41h has a hemisphere-shaped protrusion 41i that protrudes downward at the tip portion of the arm piece 41h. The hemisphere-shaped protrusion 41i can abut and slide along the upper face of the bottom plate portion 32a1-1 of the concave-shaped bottomed opening 32a1 of the cassette cover 32. Correspondingly, there is formed a hemisphere-shaped recess portion 32a1-1b in the upper face of the bottom plate portion 32a1-1 of the concave-shaped bottomed opening 32a1 of the cassette cover 32, the recess portion 32a1-1b being opened upward.

When the slide member 41 slides along the direction of X1, the hemisphere-shaped protrusion portion 41i formed at the tip portion of the L-shaped arm piece-41h of the slide member 41 can fit into or come out from the hemisphere-shaped recess portion 32a1-1b formed on the upper face of the bottom plate portion 32a1-1 inside of the concave-shaped bottomed opening 32a1 of the cassette cover 32. Since the hemisphere-shaped protrusion portion 41i clicks into the hemisphere-shaped recess portion 32a1-1b, a user can easily recognize when the slide member 41 provided on the cassette cover 32 reaches a locking position.

Since the lock/unlock means 40 is configured as stated above, the card storage cassette 30 is assembled as follows. First, as shown in FIG. 9, the slide member 41 is manually slid in the direction of X2 into an unlocking position. At this time, a user can easily slide the slide member 41 by inserting his or her fingers into the two recess portions 41d, 41d. Second, the cassette cover 32 is lowered along with the weight 51 of the weight means 50. Then, the cassette cover 32 is fitted into the cassette body 31 as shown in FIG. 10.

As stated above, because the slide member 41 has been slid in the direction of X2, the hook portion 41e of the slide member 41 stays out of the locking hole 31b2 formed by piercing through the front panel 31b of the cassette body 31. In addition, the hemisphere-shaped protrusion portion 41i provided at the tip portion of the L-shaped arm piece 41h of the slide member 41 is away from the hemisphere-shaped recess portion 32a1-1b provided on the upper face of the bottom plate portion 32a1-1 inside of the concave-shaped bottomed opening 32a1 of the cassette cover 32.

Then, the hook portion 41e is inserted into the locking hole 31b2 formed by piercing the upper portion of the front plate 31b of the cassette body 31 when the slide member 41 that is slidably engaged in the concave-shaped bottomed opening 32a1 is manually slid in the direction of X1 as shown in FIG. 11.

More specifically, the hook portion 41e of the slide member 41 is inserted farther into the first locking hole portion 31b2-1 having a higher height than the second locking hole portion 31b2-1, and thereby slide member 41 reaches the locking position.

When the hook portion 41e has reached the locking position, the cassette cover 32 cannot be removed from the cassette body 31 since the hook portion 41e is engaged with the first locking hole portion 31b2-1. Therefore, when the cassette cover 32 is raised upward while the hook portion 41e is in the locking position, the card storage cassette 30 is entirely raised, thereby facilitating a mounting and/or demounting of the cassette 30 on and/or from the card recording apparatus 10 (FIGS. 3 to 5).

By the way, when the slide member 41 is in the locking position, the shallow recess portion 41f formed on the upper face of the hook portion 41e of the slide member 41 is vertically aligned with the second locking hole portion 31b2-2 having a lower height than the first locking hole portion 31b2-1. At this time, there remains a slight gap S between the shallow recess portion 41f and the upper edge of the second locking hole portion 31b2-2. The reason that the gap S remains will be explained hereinafter.

When the slide member 41 slides along the direction of X1, the hemisphere-shaped protrusion portion 41i provided at the tip portion of the L-shaped arm piece 41h of the slide member 41 fits into the hemisphere-shaped recess portion 32a1-1b provided on the upper face of the bottom plate portion 32a1-1 inside of the concave-shaped bottomed opening 32a1 of the cassette cover 32. Since the hemisphere-shaped protrusion portion 41i clicks into the hemisphere-shaped recess portion 32a1-1b, a user can easily recognize from the clicking that the slide member 41 provided on the cassette cover 32 reaches a locking position.

Next, when the cassette cover 32 is raised in relation to the cassette body 31 while the slide member 41 provided on the cassette cover 32 is in the locking position, the card storage cassette 30 comes to look shown in FIG. 12.

More specifically, when the cassette cover 32 is raised upward (in a direction of Y1), the cassette body 31 resists the upward movement due to its weight. Accordingly, the second locking hole portion 31b2-2 having a lower height than the first locking hole portion 31b2-1 is engaged with the shallow recess portion 41f formed on the upper face of the hook portion 41e of the slide member 41. As a result, the gap S described with reference to FIG. 11 disappears and the slide member 41 cannot move even by a strong sliding force applied thereon, thereby preventing the slide member 41 from unlocking.

Namely, when the slide member 41 arrives at the locking position, the second locking hole 31b2-2 having a lower height within the locking hole 31b2 that pierces through the front plate 31b of the cassette body 31 and the recess portion 41f formed on the upper face of the hook portion 41e of the slide member 41, both of which are in a concave-convex relation, are engaged with each other eliminating the gap S, thereby constituting a unlocking prevention means that prevents the cassette cover 32 from being removed when the cassette member 31 is raised upward.

According to the aforementioned structure, the card storage cassette 30 can be carried around safely without separating apart because the slide member 41 is not removed by accident.

By the way, when unlocking the hook portion 41e of the slide member 41 from the locking hole 31b2 that pierces through the front plate 31b of the cassette body 31, the slide member 41 has only to be slid manually in the direction of X2. With this sliding, the lock/unlock means 40 changes its state from FIG. 11 to FIG. 10.

The lock/unlock member 40 that locks/unlocks the cassette cover 32 to/from the cassette body 31 is not necessarily limited to the above-stated structure. For example, a lock/unlock member can have a hook portion on the cassette body 31 and a locking hole on the cassette cover 32. In addition, a lock/unlock member is also preferable if it can be configured in a manner that prevents a slide member from moving toward an unlocking position when the cassette cover 32 is raised upward.

Moreover, in the above embodiment, the weight 51 of the weight means 50 supported by the cassette cover 32 is removed along with the cassette cover 32 when the cassette cover 32 is removed from the cassette body 31. However, it is possible that the weight 51 of the weight means 50 is not provided in the card storage cassette 30.

Even when the weight 51 of the weight means 50 is not provided in the card storage cassette 30, the card storage cassette has to be configured in the following manner. Namely, the cassette body 31 has the bottom plate 31a, the front plate 31b, the left side plate 31c, and the right side plate 31d, whereas the cassette cover 32 has at least the top plate 32a and the rear plate 32b. In addition, the vertical guide means that restricts the two-dimensional position of the cassette cover 32 in relation to the cassette body 31 and allows the cassette cover 32 to slide vertically is provided between the rear plate 32b and the pair of left side plate 31c and the right side plate 31d. Moreover, the cassette body 31 and the cassette cover 32 are configured so as to be framed into a box shape using the vertical guide means while the cassette body 31 is detachable from the cassette body 31 along the vertical guide means.

By the way, the vertical guide means can have various shapes as far as it can restrict the two dimensional position of the cassette cover 32 and allows the cassette cover 32 to vertically slide in relation to the cassette body 31.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A card recording apparatus comprising:
   a card storage cassette storing a plurality of cards in a manner of stacking vertically thereon said cards to maintain a card face of said cards substantially horizontally,
   a pick-up roller ejecting the undermost one of said plurality of cards stored in said card storage cassette from said storage cassette, and
   a recording means recording predetermined information on said card ejected from said card storage cassette,
   wherein said card storage cassette includes;
   a cassette body having
      a bottom plate on which said plurality of cards are vertically stacked in a manner of maintaining said card face substantially horizontally, the bottom plate allowing said pick-up roller to enter therethrough,
      a front plate being provided vertically on said bottom plate so as to guide a front edge face of said plurality of cards and having an opening through which the undermost one of said plurality of cards is ejected, the opening being provided at a lower portion of said front plate, and
      a left-and-right pair of side plates being provided vertically on said bottom plate so as to guide a right and a left edge face of said plurality of cards, respectively, the side plates being orthogonal with said front plate; and a cassette cover having at least a top plate opposing said bottom plate of said cassette body and serving to close an upper portion of said cassette cover, and a rear plate suspending from said top plate and serving to close a rear portion of said cassette cover, the rear plate opposing said front plate of said cassette body; and wherein said card storage cassette is provided with a vertical guide means that restricts a two dimensional position of said cassette cover in relation to said cassette body and allows said cassette cover to vertically move in relation to said cassette body, the vertical guide means being located between said left-and-right pair of side plates of said cassette body and said rear plate of said cassette cover, so that while said cassette body and said cassette cover are framed into a box shape by use of said vertical guide means, said cassette cover is detachable from said cassette body along said vertical guide means.

2. A card storage cassette in which a plurality of cards are stored so that said plurality of cards are vertically stacked in a manner that maintains a card face of the plurality of cards substantially horizontally and from which the undermost one of the plurality of cards can be ejected forward by rotation of a pick-up roller provided outside, the card storage cassette comprising:

a cassette body having a bottom plate on which said plurality of cards are vertically stacked in a manner of maintaining said card face substantially horizontally, the bottom plate allowing said pick-up roller to enter therethrough, a front plate being provided vertically on said bottom plate so as to guide a front edge face of said plurality of cards and having an opening through which the undermost one of said plurality of cards is ejected, the opening being provided at a lower portion of said front plate, and a left-and-right pair of side plates that are provided vertically on said bottom plate so as to guide a right and a left edge face of said plurality of cards, respectively, the side plates being orthogonal with said front plate; and a cassette cover having at least a top plate opposing said bottom plate of said cassette body and serving to close an upper portion of said cassette cover, and a rear plate suspending from said top plate and serving to close a rear portion of said cassette cover, the rear plate opposing said front plate of said cassette body;

wherein while said cassette body and said cassette cover are framed into a box shape by use of a vertical guide means that restricts a two dimensional position of said cassette cover in relation to said cassette body and allows said cassette cover to vertically move in relation to said cassette body, said cassette cover is detachable from said cassette body along said vertical guide means, the vertical guide means being located between said left-and-right pair of side plates of said cassette body and said rear plate of said cassette cover.

3. A card storage cassette in which a plurality of cards are stored so that said plurality of cards are vertically stacked in a manner that maintains a card face of the plurality of cards substantially horizontally and from which the undermost one of the plurality of cards can be ejected forward by rotation of a pick-up roller provided outside, the card storage cassette comprising:

a cassette body having a bottom plate on which said plurality of cards are vertically stacked in a manner of maintaining said card face substantially horizontally, the bottom plate allowing said pick-up roller to enter therethrough, a front plate being provided vertically on said bottom plate so as to guide a front edge face of said plurality of cards and having an opening through which the undermost one of said plurality of cards is ejected, the opening being provided at a lower portion of said front plate, and a left-and-right pair of side plates being provided vertically on said bottom plate so as to guide a right and a left edge face of said plurality of cards, respectively, the side plates being orthogonal with said front plate, and a cassette cover having a top plate opposing said bottom plate of said cassette body and serving to close an upper portion of said cassette cover, a rear plate suspending from said top plate and serving to close a rear portion of said cassette cover, the rear plate opposing said front plate of said cassette body, and a left-and-right pair of side plates suspending vertically from said top plate and supporting a weight that abuts the uppermost one of said plurality of cards so that the weight is movable in a gravitational direction, the side plates being orthogonal with said rear plate, wherein while said cassette body and said cassette cover are framed into a box shape by use of a vertical guide means that restricts a two dimensional position of said cassette cover in relation to said cassette body and allows said cassette cover to vertically move in relation to said cassette body, said cassette cover is detachable from said cassette body along said vertical guide means, with said weight supported, the vertical guide means being located between said left-and-right pair of side plates of said cassette body and said rear plate of said cassette cover.

* * * * *